Patented Apr. 15, 1947

2,418,902

UNITED STATES PATENT OFFICE 2,418,902

PROCESS FOR PRODUCING PANTOTHENIC ACID

Dilworth T. Rogers, Pearl River, N. Y., assignor, by mesne assignments, to American Cyanamid Company, New York, N. Y., a corporation of Maine No Drawing. Application March 19, 1941, Serial No. 384,226

5 Claims. (Cl. 260—534)

This invention relates to the preparation of biologically active substances and more particularly relates to a method for the preparation of pantothenic acid.

In accordance with the present invention I have found that pantothenic acid can be prepared by fusing α-hydroxy-β,β-dimethyl-γ-butyrolactone with β-alanine. In carrying out the fusion reaction the ratio of the reactants can be varied within certain reasonable limits and the conditions under which the fusion is carried out may also be varied over a considerable range. I usually prefer to use approximately equivalent molecular proportions of the β-alanine and the α-hydroxy-β,β-dimethyl-γ-butyrolactone. However, a desirable product can be obtained using either an excess of β-alanine or an excess of the α-hydroxy-β,β-dimethyl-γ-butyrolactone. I prefer to carry the fusion out at a temperature of about 150° C. and employing this temperature, the reaction is usually complete in about two hours, and there is no appreciable decomposition. The reaction can be carried out at a temperature of about 100° C.; however, at this temperature an excessively long period of heating is required. When the fusion is carried out at a temperature of about 200° C. a solution is obtained and the reaction appears to be complete in from five to ten minutes; however, at this high temperature the reaction may be accompanied by some decomposition. Usually the fusion is carried out employing analytically pure β-alanine and analytically pure α-hydroxy-β,β-dimethyl-γ-butyrolactone since the final product is used primarily for biological purposes. It is to be understood, however, that relatively impure reactants may be employed and still produce pantothenic acid which can easily be purified by known methods to produce a pure product. In the processes for producing β-alanine frequently the final product contains some impurities in the form of sodium β-alanate or ammonium β-alanate depending upon the process used in making the β-alanine. The presence of this small quantity of sodium or ammonium β-alanate does not interfere with the fusion reaction and in fact may actually serve to increase the yields of pantothenic acid when fused with α-hydroxy-β,β-dimethyl-γ-butyrolactone. In some instances it may be desirable to add a diluent to the reaction mixture. For example, when a small amount of water is added to the reaction mixture there appears to be a slight increase in yield. The amount of water added is, of course, a relatively small amount, and it is not sufficient to act as a solvent, and it is believed that the improved yields may be due to the increased miscibility of the reactants in the presence of the moisture.

The following examples represent suitable methods for carrying out the reaction. These particular examples, however, are given for purposes of illustration only and the invention is not to be strictly limited to the details set forth therein.

Example 1

One gram of analytically pure α-hydroxy-β,β-dimethyl-γ-butyrolactone was mixed with 0.7 g. of β-alanine and heated at 150° C. for 1¼ hours. Unreacted lactone (0.4 g.) was extracted with ether and uncombined β-alanine (0.5 g.) precipitated with absolute ethanol. The yellow oil obtained by the evaporation of the alcohol (0.8 g.) contained the equivalent of 8–14% d-calcium pantothenate. This represents a conversion of 39% based on the β-alanine used in the preparation.

Example 2

1.46 g. of α-hydroxy-β,β-dimethyl-γ-butyrolactone was fused with one gram of β-alanine at 150° C. for about two hours. Biological assays of the fusion product on Lacto basillus casei E indicated that about 12.8% coupling had taken place.

Example 3

A fusion similar to that described in Example 1 was carried out using 4.5 g. of α-hydroxy-β,β-dimethyl-γ-butyrolactone and 3.0 g. of an impure β-alanine containing about 3.22% ash. In this example two drops of water was added to the mixture and the fusion was carried out at a temperature of about 155° C. and for a period of one hour. A biological assay in this case indicated that 17.6% coupling had taken place.

Example 4

A fusion reaction was carried out using the same quantities of ingredients employed in Example 1 and under the same conditions except that two drops of water were added to the fusion mixture. In this case the biological assay indicated that 15.6% coupling had taken place.

Fusion reactions were also carried out at temperatures of about 200° C. When these higher temperatures were used the reactions were complete in from 5 to 10 minutes and the yields were only slightly less than the reactions carried out at 150° C. However the reactions were generally accompanied by some decomposition and the pantothenic acid produced was difficult to purify.

The racemic dl-form of the α-hydroxy-β,β-dimethyl-γ-butyrolactone was used in the above examples. The pantothenic acid produced, therefore, is a mixture of the d and l pantothenic acids. Only the d-form of the pantothenic acid has biological activity. Therefore, the products obtained by the above fusions possess only about half as much activity as does d-pantothenic acid. By using levo-α-hydroxy-β,β-dimethyl-γ-butyrolactone instead of the racemic lactone in the above examples, the resulting pantothenic acid produced is the d-form and possesses full biological activity. Levo-α-hydroxy-β,β-dimethyl-γ-butyrolactone can be produced by known methods of resolution from the dl-α-hydroxy-β,β-dimethyl-γ-butyrolactone. A suitable method is described in J. S. C. S. 62, 778 (1940). In the following Example 5, 2.6 g. of (—) resolved-lactone was fused with 1.73 g. of β-alanine at a temperature of 155° C. for two hours. This fusion results in the production of d-pantothenic acid and a biological assay indicated that 9.6% coupling had taken place.

What I claim is:

1. The process of producing pantothenic acid which comprises fusing β-alanine with α-hydroxy-β,β-dimethyl-γ-butyrolactone.

2. The process of producing pantothenic acid which comprises fusing β-alanine with α-hydroxy-β,β-dimethyl-γ-butyrolactone at a temperature of about 150° C.

3. The process of producing pantothenic acid which comprises fusing β-alanine with α-hydroxy-β,β-dimethyl-γ-butyrolactone at a temperature of about 150° C. and for a period of about two hours.

4. A process of producing pantothenic acid which comprises fusing a mixture of β-alanine and α-hydroxy-β,β-dimethyl-γ-butyrolactone to which has been added a small amount of water.

5. A process of producing d-pantothenic acid which comprises fusing β-alanine with levo-α-hydroxy-β,β-dimethyl-γ-butyrolactone at a temperature of about 150° C.

DILWORTH T. ROGERS.

REFERENCES CITED

The following references are of record in the file of this patent:

UNITED STATES PATENTS

| Number | Name | Date |
|---|---|---|
| 2,234,680 | Moore | July 22, 1940 |

OTHER REFERENCES

Williams et al., "J. Am. Chem. Soc.," vol. 62, pp. 1784–85. (Copy in Patent Off. Lib.)